United States Patent [19]

Grube

[11] Patent Number: 5,073,927

[45] Date of Patent: Dec. 17, 1991

[54] IMAGING IDENTIFICATION METHOD FOR A COMMUNICATION SYSTEM

[75] Inventor: Gary W. Grube, Palatine, Ill.

[73] Assignee: Motorola, Inc., Schaumburg, Ill.

[21] Appl. No.: 399,796

[22] Filed: Aug. 29, 1989

[51] Int. Cl.$^5$ .......................................... H04M 11/00
[52] U.S. Cl. .......................................... 379/53; 382/2; 358/85
[58] Field of Search ................... 379/52-54, 379/142, 354; 382/2; 358/85

[56] References Cited

U.S. PATENT DOCUMENTS

| | | | |
|---|---|---|---|
| 3,946,158 | 3/1976 | Leclercq et al. | 379/53 |
| 4,485,400 | 11/1984 | Lemelson et al. | 379/53 |
| 4,715,059 | 12/1987 | Cooper et al. | 379/53 |
| 4,776,005 | 10/1988 | Petriccione et al. | 379/142 |
| 4,805,205 | 2/1989 | Faye | 379/205 |
| 4,924,496 | 5/1990 | Figa et al. | 379/142 |

FOREIGN PATENT DOCUMENTS

| | | | |
|---|---|---|---|
| 0320828 | 6/1989 | European Pat. Off. | 379/53 |
| 0059854 | 4/1985 | Japan | 379/142 |
| 0086686 | 4/1988 | Japan . | |
| 0212056 | 8/1989 | Japan | 379/53 |

Primary Examiner—Jin F. Ng
Assistant Examiner—Wing F. Chan
Attorney, Agent, or Firm—Timothy W. Markison; Steven G. Parmelee; Joseph P. Krause

[57] ABSTRACT

In a communication system wherein subscriber units and dispatch consoles are equipped with a display device and an image storage device. By having the communication unit so equipped, the operator of a communication unit can readily identify an operator of a transmitting communication unit by displaying an image of the transmitting communication unit throughout the call.

9 Claims, 3 Drawing Sheets

IMAGING IDENTIFICATION METHOD FOR A COMMUNICATION SYSTEM

TECHNICAL FIELD

The present invention relates generally to communication systems and in particular to such systems wherein any of a plurality of communication units, when receiving a call, may readily identify the caller by displaying an image of the caller.

BACKGROUND OF THE INVENTION

Typical trunked communication systems have a limited number of communication resources which are efficiently allocated among a plurality of communication units by at least one communication resource controller. Any of the plurality of communication units may gain access to one of the communication resources by transmitting an inbound signalling word (ISW) to the communication resource controller. The ISW generally contains the communication unit's individual identification code, the communication unit's group affiliation, if it has one, and an op-code requesting access to one of the communication resources. After verifying the ISW, the communication resource controller allocates one of the communication resources to the communication unit which sent the ISW, if the ISW is valid and a communication resource is available.

Once a communication unit has been granted access to a communication resource, the communication unit, or units, intended to receive the call, are notified of the communication resource to be used and the individual identification code of the transmitting communication unit. The receiving communication unit, or units, may be any communication unit having the same group affiliation as the transmitting communication unit, or any communication unit which was specifically identified by the transmitting communication unit.

A receiving communication unit generally displays the transmitting communication unit's individual identification code such that the operator of the receiving communication unit may identify the operator of the transmitting communication unit (caller). The display is usually limited to a particular size and alpha-numeric format. For example, the display may comprise a binary, decimal, or hexadecimal representation of the individual identification code such as 10101010, 146967, or FE43A; respectively, or it may comprise an alpha-numeric alias of the individual identification code such as UNIT 12.

An operator of a receiving communication unit may have a difficult time identifying the caller based on the individual identification code, especially in a large trunked communication system or when the transmitting unit is not part of a fixed dispatch operation. Unless the operator of the receiving communication unit has associated a caller with an individual identification code, it may not be able to identify the caller. This may become a substantial limitation when the identity of the caller must be known. For example, the caller's identity is often required in trunked communication systems where security, call logging, or user-vehicle association is a primary concern.

Therefore, a need exists for a method and apparatus in which an operator of a receiving communication unit may easily identify the operator of a transmitting communication unit.

SUMMARY OF THE INVENTION

These needs and others are substantially met by the imaging identification method for a communication system discussed herein. The method of displaying an image related to a transmitting communication unit comprises the steps of receiving a call from the transmitting communication unit, and displaying the image related to the transmitting communication unit when it is available.

In one embodiment, a communication unit displays a default image until it receives a call from a transmitting communication unit. Once a call is received, the receiving communication unit will check an internal image database to determine if it has an image stored for the transmitting communication unit. If an image exists, the image for the transmitting communication unit will be displayed. If an image does not exist, the default image will be displayed. Prior to the end of the call, the receiving communication unit may receive a call from a different communication unit. If a new call is received, the receiving communication unit repeats the image database look-up and image display process. Once the call has ended, the receiving communication unit will display the default image and await another call.

BEST MODE FOR CARRYING OUT THE INVENTION

Figure 1:
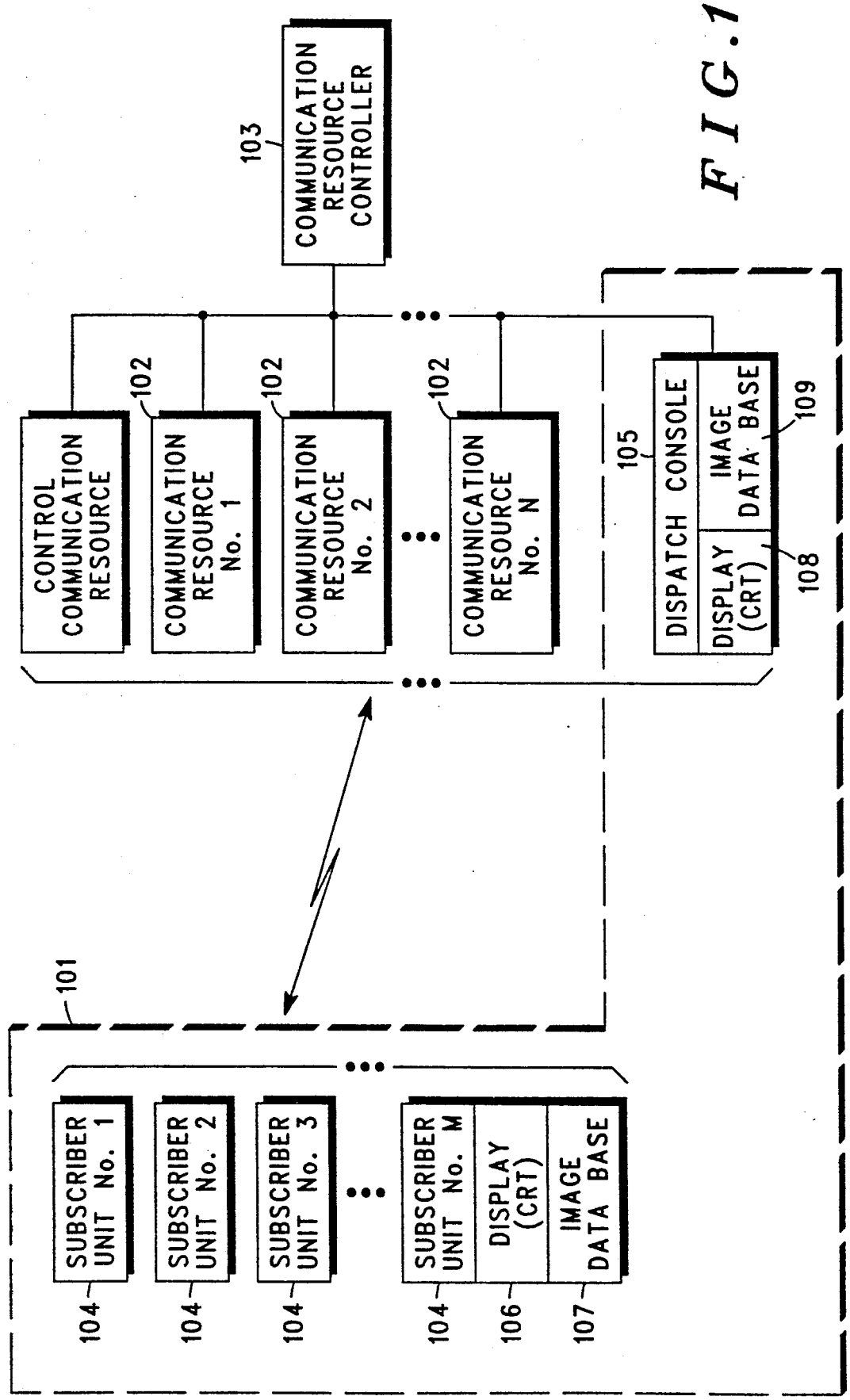
FIG. 1 illustrates a block diagram of a trunked communication system that may operate in accordance with the present invention.

FIG. 1 illustrates a communication system (100) that may implement the disclosed invention. The system (100) comprises a plurality of communication units (101). A trunked communication system that implements the disclosed invention further comprises a limited number of communication resources (102) (shown are n number of communication resources), a control communication resource (110), and a communication resource controller (103). The plurality of communication units (101) comprise a plurality of subscriber units (104) (shown are m number of subscriber units, where m is a substantially larger number than n) and may also comprise at least one dispatch console (105). In order to implement the present invention, each of the subscriber units (104) and the dispatch console (105) have a display (106 and 108) and an image database (107 and 109). The display (106 and 108) may be a CRT, an LCD display, or the equivalent, and the image database (107 and 109) may be any data storage device such as a microcomputer, programmable array logic device, digital disk storage device, or CD ROM.

Generally, once one of the communication units (101) has received access to a communication resource and is ready to transmit, the communication resource controller (103) transmits, via the control communication resource (110), an outbound signaling word (OSW) to the remaining communication units (101). The OSW comprises the individual identification code and the group affiliation, if available, of the transmitting communication unit, and notification of the communication resource that will be used. All communication units (101) affiliated to the same group, or identified as receiving communication units, will check its individual image database (107 and 109) to determine if an image of the transmitting communication unit (101) is stored. If the image of the transmitting communication unit exists, the receiving communication unit will temporarily display the image. If the image of the transmitting communication unit does not exist, the communication unit will display a default image. Once the call has ended, or shortly thereafter or before, the receiving communication unit (101) will display the default image and await, or place, a new call. An image of a communication unit, or the default image, may be any graphical representation which is capable of being stored.

Figure 2:
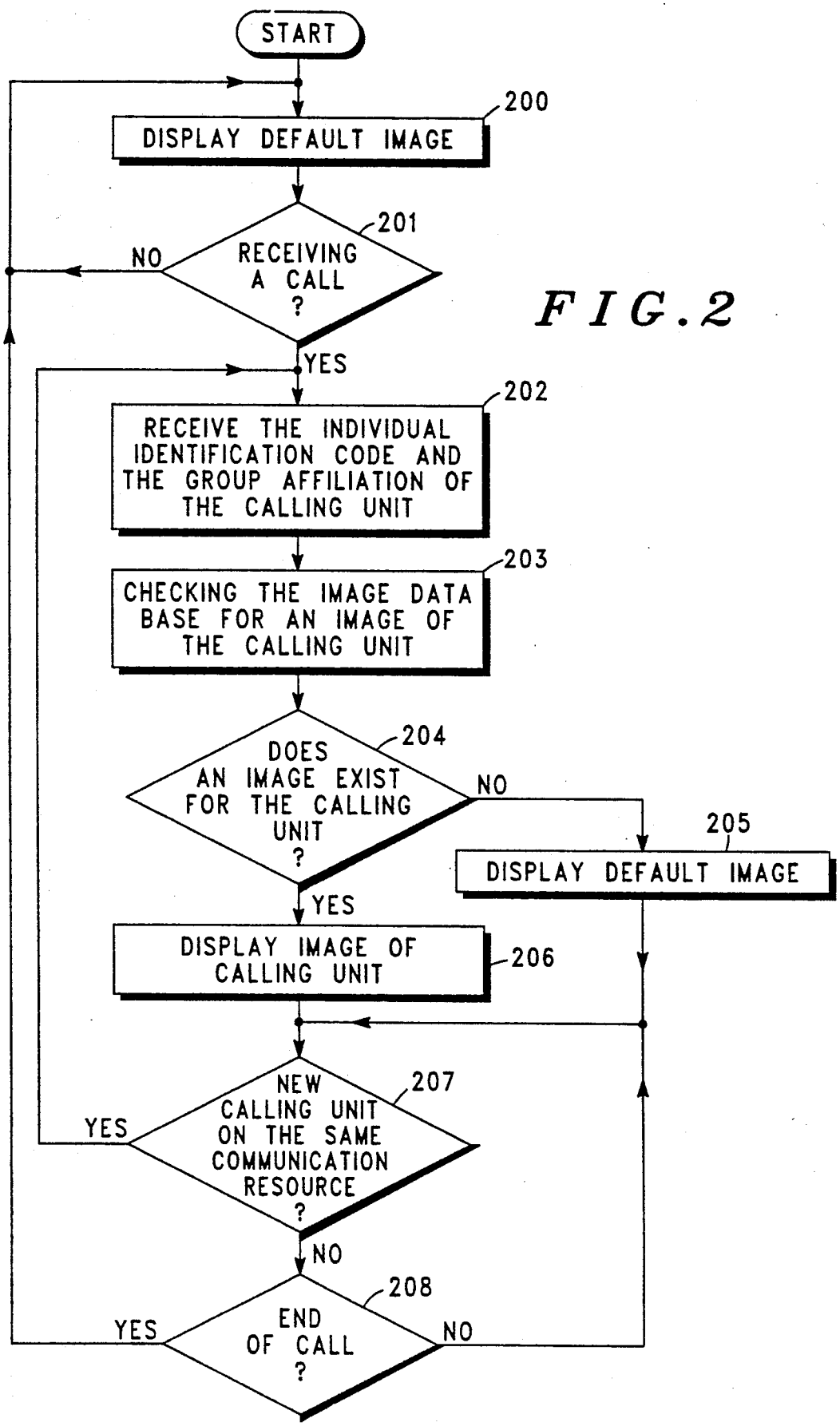
FIG. 2 illustrates a flow chart of the image displaying process which a communication unit of the trunked communication system of FIG. 1 may employ.
Figure 3A:
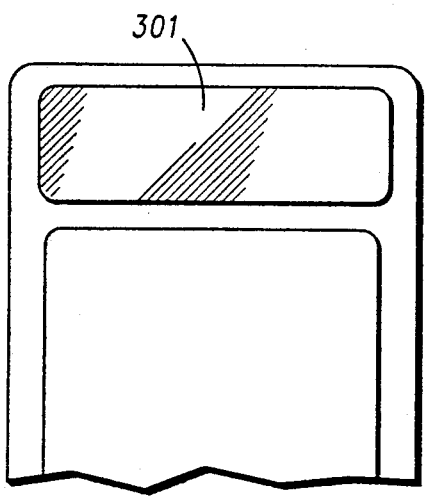
FIG. 3 illustrates a communication unit having a display device (FIG. 3A) and a few possible images which may be displayed (FIGS. 3B–3F).
Figure 3D:
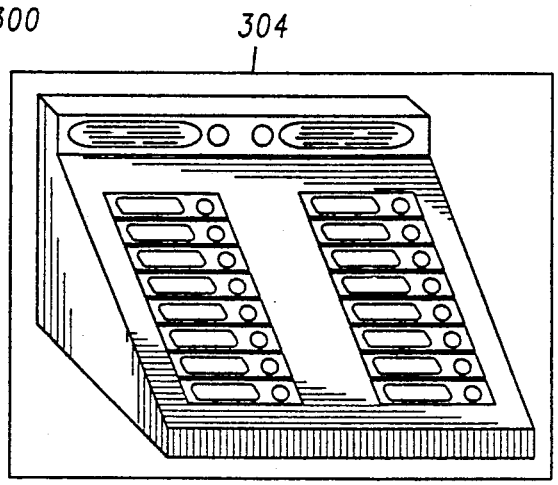
Figure 3C:
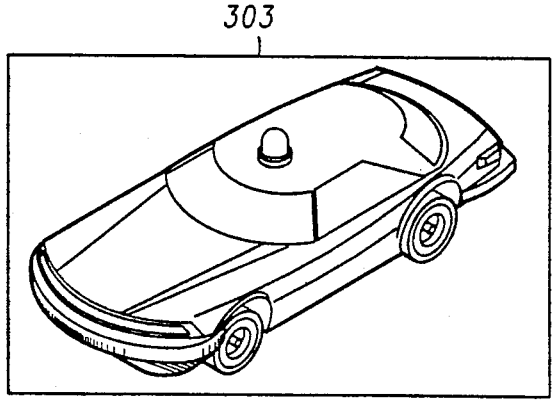
Figure 3B:
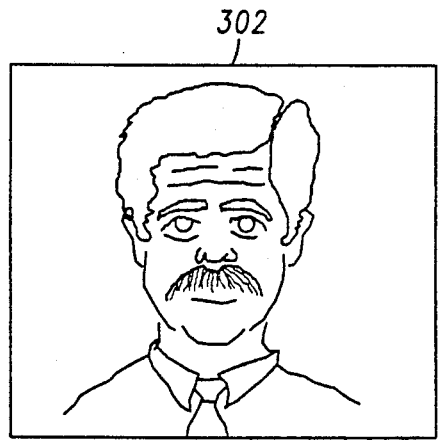
Figure 3E:
Figure 3F:
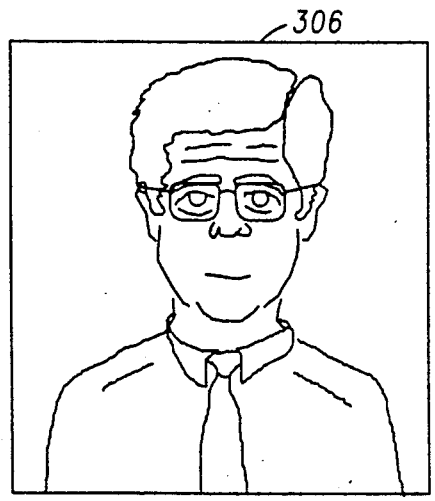

Referring to FIG. 2, a receiving communication unit (101) displays a default image (200) prior to receiving a call from a transmitting communication unit. Once a call is received (201), the individual identification code and the group affiliation, if available, of the transmitting communication unit is further received by the receiving communication unit (202). Once this information has been received, the receiving communication unit (101) checks its individual image database (107 and 109) to determine if an image of the transmitting communication unit is stored (203). The image of the transmitting communication unit may be addressed, in the image datatbase, by its individual identification code, group affiliation, or both. If the image does not exist (204), the receiving communication unit will display the stored default image (205). If the image does exist (204), the image of the transmitting communication unit will be displayed (206).

While having access to a communication resource, the receiving communication unit may receive a new call from another communication unit (207). A new transmitting communication unit is processed in the same manner as discussed above. The receiving communication unit will check the image database to see if an image of the new transmitting communication unit exists, and display the appropriate image. If a new call is not received prior to relinquishing the communication resource (call ending) (207 and 208), the receiving communication unit will display a default image and the process will repeat. If the call has not ended (208), the receiving communication will await the end of the call or a new call from another communication unit (101).

FIG. 3 illustrates a communication unit (300) having a display device (301) and a few of the possible images which may be stored and displayed. The images may be a picture of the operator (302), a mobile unit (303), a dispatch console (304), or a fireman (305). The communication unit (300) may, in addition to displaying an image, may display an alpha-numerical representation of the individual identification code of the transmitting communication unit (306).

In a large communication system (100), where there are thousands of subscriber units (104) and possibly several dispatch consoles (105), the need for the present invention becomes apparent. By having the image of the transmitting communication unit (101) displayed on each of the receiving communication units (101) the receiving communication units can readily identify the operator of the transmitting communication unit.

What is claimed is:

1. In a trunked communication system having a limited number of communication resources and at least one communication resource controller for allocating the limited number of communication resources among a plurality of communication units, a communication unit when receiving a call temporarily displays an image of another communication unit that transmits the call, the communication unit comprising:

image storage means for storing images of other communication units of the plurality of communication units and for storing default images; and display means, operably associated with the image storage means, for displaying the images of other communication units of the plurality of communication units and displaying said default images if images of said other communication units are not found in said image storage means.

2. The communication unit of claim 1 wherein the displaying means further comprises means for displaying the stored image of the another communication unit whenever it receives a call from another communication unit.

3. The communication unit of claim 1 wherein the display means further comprises means for displaying an alpha-numerical representation of an individual identification code of the transmitting communication unit.

4. In a trunked communication system having a limited number of communication resources and at least one communication resource controller for allocating the limited number of communication resources among a plurality of communication units, a method for each of at least one of the plurality of communication units that is receiving a call to temporarily display an image of a transmitting communication unit, the method comprises the steps of:

a) receiving an identification code of the transmitting communication unit;

b) searching an image data base for a stored image of the transmitting communication unit;

c) displaying the stored image of the transmitting communication unit when the stored image of the transmitting communication unit is found in the image data base; and d) displaying a stored default image when the stored image of the transmitting communication unit is not found in the image data base.

5. The method of claim 1 further comprising displaying a default image after the call from the transmitting communication unit has ended.

6. The method of claim 1 further comprising displaying a default image prior to receiving the call from the transmitting communication unit.

7. The method of claim 1 further comprising the step of displaying an alpha-numerical representation of the transmitting communication unit's individual identification code.

8. The method of claim 1 further comprising the step of receiving a group affiliation of the transmitting communication unit and checking the image database for the image of the transmitting communication unit based, at least in part, on the group affiliation.

9. The method of claim 1 further comprising the steps of receiving a call from another one of the plurality of communication units prior to reallocation of the communication resource and displaying an image of the another one of the plurality of communication units when the image of another one of the plurality of communication units is found in the image data base.

* * * * *